United States Patent
Ashbrook et al.

(10) Patent No.: US 8,126,517 B2
(45) Date of Patent: Feb. 28, 2012

(54) MOBILE TELECOMMUNICATIONS DEVICE

(75) Inventors: David Ashbrook, Newbury (GB); Neil Holmes, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 555 days.

(21) Appl. No.: 12/148,512

(22) Filed: Apr. 18, 2008

(65) Prior Publication Data
US 2008/0261662 A1   Oct. 23, 2008

(30) Foreign Application Priority Data
Apr. 19, 2007   (GB) .................................. 0707606.0

(51) Int. Cl.
*H04B 1/38* (2006.01)
(52) U.S. Cl. ........................ 455/574; 455/566
(58) Field of Classification Search .................. 455/574, 455/566
See application file for complete search history.

(56) References Cited

U.S. PATENT DOCUMENTS

| | | | |
|---|---|---|---|
| 5,895,440 A * | 4/1999 | Proctor et al. .................. | 702/63 |
| 6,313,832 B1 | 11/2001 | Ishida | |
| 6,405,062 B1 | 6/2002 | Izaki | |
| 2001/0029196 A1 | 10/2001 | Wakamatsu | |
| 2003/0020700 A1 * | 1/2003 | Danis ............................ | 345/204 |
| 2004/0014489 A1 | 1/2004 | Miyachi et al. | |
| 2007/0042813 A1 | 2/2007 | Ito | |
| 2008/0057894 A1 * | 3/2008 | Aleksic et al. ............. | 455/187.1 |

FOREIGN PATENT DOCUMENTS

| | | |
|---|---|---|
| EP | 0 593 198 A2 | 4/1994 |
| GB | 2 360 598 A | 9/2001 |
| JP | 2003-304319 | 10/2003 |
| JP | 2006-101584 A | 4/2006 |
| WO | WO 00/76018 A1 | 12/2000 |
| WO | WO 2004/047416 A1 | 6/2004 |
| WO | WO 2005/006794 A1 | 1/2005 |
| WO | WO 2005/048573 A1 | 5/2005 |

* cited by examiner

*Primary Examiner* — Lewis West
(74) *Attorney, Agent, or Firm* — Muirhead and Saturnelli, LLC

(57) ABSTRACT

An arrangement and technique for providing an educated indication of battery consumption for any particular mobile terminal usage type. This allows the user to be provided with an accurate indication of the battery life remaining for the current usage type and also the battery life that is remaining for any other possible use of the mobile terminal. The mobile terminal preferably uses historical and/or statistical profiling for the different usage types to provide a meaningful indication of remaining battery life for at least one different usage type at any one time. In particular, the indication preferably includes a time representation that is specific to a usage type. The different usage types may include mobile television, game playing and voice calls.

28 Claims, 1 Drawing Sheet

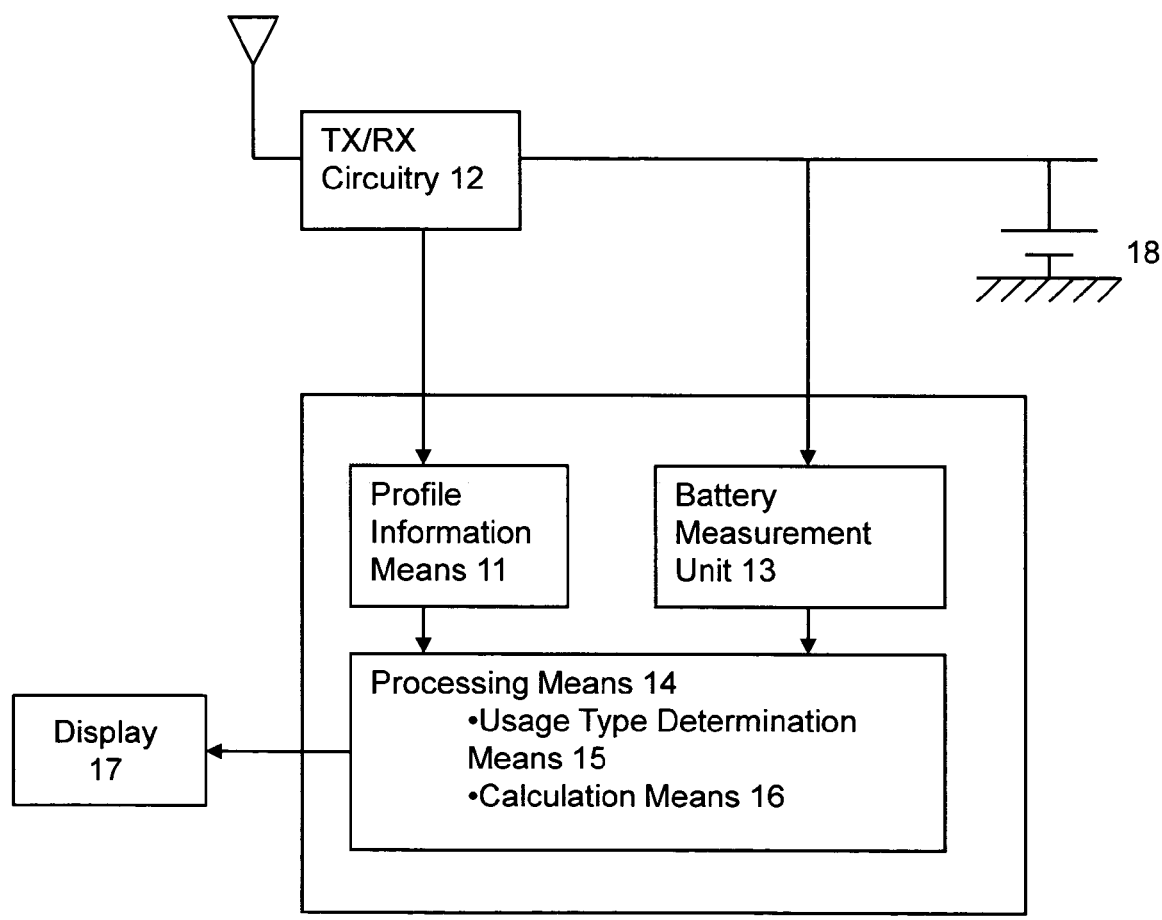

MOBILE TELECOMMUNICATIONS DEVICE

FIELD OF THE INVENTION

This invention relates to a mobile telecommunications device and an associated technique for providing an indication of battery charge level.

BACKGROUND

Most mobile terminals are equipped with a battery level indicator. A typical indicator visually represents battery level using a plurality of bars, with one bar typically indicating a low capacity, and five bars, for example, indicating a full charged battery. However, battery gauges used in mobile devices are not standardised in any way, and operate using a variety of different methods. Therefore, in view of this disparity, two bars on some terminals will be the same as three or four on others. This leads to terminal users having little idea as to what the battery gauge is actually showing, and how much capacity is in fact available to them.

Further, it is not unusual for the battery level information to be based purely on an estimate of the current drain rate of the application that is currently in progress. This can also lead to consumer confusion, as different applications use different amounts of power and so the visual representation of the battery charge level can vary dramatically over a short period of time.

For instance, if a mobile terminal is on standby, the battery capacity representation may indicate the battery is close to full capacity. If a person then uses the terminal to view, for instance, a multicast service, the battery may decrease markedly, even after only a few of minutes. This can mislead users to cease from using the terminal at all, due to the mistaken belief that the terminal battery is about to run out, and so they need to conserve it in case they need to make an urgent call later before the terminal is recharged.

Even if the battery gauge were to revert to a higher charge level once a user stopped using a high-power application, indicating that more battery life was available, this is still unsatisfactory for most users as it provides little certainty of the actual battery charge level and also no insight into for how long they can use the terminal applications. For network operators, it is also unsatisfactory, as it discourages users from using the terminal applications, and particularly high-value applications such as mobile television.

SUMMARY OF THE INVENTION

According to a first aspect, the present invention provides a method of providing a usage-dependent indication of battery level on a mobile telecommunications device, the method including: determining a battery level measurement; determining at least one usage-type relative to which the battery level is to be indicated; determining a profile for each of the at least one usage-type; and applying each profile to the determined battery level measurement to obtain a battery level indication relative to each usage-type.

According to a second aspect, the present invention provides a mobile telecommunications device, including: battery means; profile means configured to store a plurality of usage-type profiles; and calculation means configured to calculate at least one usage dependent indication of the battery level relative to at least one of the profiles.

Preferably the plurality of usage-type profiles relate to a plurality of functional uses and/or usage-locations of the mobile device.

BRIEF DESCRIPTION OF THE DRAWINGS

The sole FIGURE illustrates a functional block diagram of an arrangement for use on a mobile telecommunications device for providing an application dependent battery charge level indication, according to an embodiment of the invention.

DETAILED DESCRIPTION OF EMBODIMENTS OF THE INVENTION

According to a first embodiment of the invention, an arrangement for indicating battery charge level on a "per application" or "usage-type" basis is provided.

With reference to the sole FIGURE, according to this embodiment, the arrangement for providing an indication of battery charge level includes a profile information means 11. This profile information means 11 includes a number of profile sections or profile "boxes" (not shown) with each profile section includes information relating to a specific mobile terminal usage-type. The specific mobile terminal usage types may include mobile television functionality, circuit-switched voice call functionality, game playing functionality, and wireless Internet usage functionality amongst others.

These profile sections may be empty when the mobile terminal is shipped and populated as the mobile terminal is used. The profiles may also be pre-loaded and be updatable. Preferably the profiles are updated with real time data to allow device specifics to be incorporated. In this regard, data may be acquired through use, and statistical averaging of the historical data used to calculate the best profile fit. Alternatively the data in the profile sections may be pre-designated, such that they are populated with data from previous research.

In order to be able to populate and/or update the profile sections, the profile information means 11 is in communication with the mobile terminal's transmission and reception circuitry 12.

The arrangement also includes a Battery Measurement Unit 13, which is connected to the Battery 18. This Battery Measurement Unit 13 monitors the current charge level of the battery 18. This preferably achieved by monitoring the voltage level of the battery.

The Battery Measurement Unit 13 provides the monitored battery charge level to Processor 14. Preferably the Battery Measurement Unit 13 periodically provides the voltage level to the Processor 14. For instance, the Processor may be provided with updates on the battery voltage level every five seconds.

As each different mobile terminal usage type has different characteristics, the profile segments of the profile information means 11 each store information that is dependent on the different characteristics of each usage type. For instance, mobile TV data is generally only received, whereas voice calls entail data being transmitted and received. For game play, on the other hand, reception and transmission of data from/to the network is not required. These different operational characteristics will affect the power consumption of each of the mobile terminal usage types. Therefore, for instance, each profile segment includes information that relates to the expected power consumption or battery drain rate of its specific mobile terminal usage type. Further, where data is transmitted and/or received from the network, the profile segments can include information relating to expected path loss.

Preferably the information is obtained from historical and/or statistical profiling of battery consumption for each of the particular usage types. This use of historical data to populate the profiles on a per application/usage type basis results in a more effective analysis of the battery usage. Preferably the statistical profile information is live information. The use of historic statistical receiver 'on time' and transmit power information allows battery level calculations for multiple usage types to be performed.

This information can then be used to make a customised usage type-dependent measurement of the battery charge level. This information may be provided to the mobile terminal during manufacture, downloaded at a later date or learnt by the mobile terminal itself, in terms of being derived from measurements undertaken within the terminal. Ideally, a combination of all three approaches is utilised. Similarly, this profiling information may be updated by external download or internal updates, as required.

In use, the processor 14 will be provided with a battery level measurement from the Battery Measurement Unit 13. This measurement is provided to the Calculation means 16, a component of the Processor.

The Processor will determine one or more Usage-Types relative to which a battery level indication is to be provided. This function will be performed by a usage type determination means 15 of the processor 14.

The usage-type determination means 15 may determine the usage type by determining what application is currently in use. For instance, if the user is currently utilising the mobile television function, the component 15 may decide to provide the battery level indication relative to the mobile television function. Alternatively, the user may input one or more different applications/usage-types that they wish a battery level indication to be provided for. For instance, the user may be interested in watching television on the mobile device, and also be considering making a number of voice calls, and therefore request that a battery level indication be displayed for both of these usage types. Further, the user, whilst watching television on the terminal, can check how long they have left in their battery to make a voice call. Therefore, this feature allows the user to determine the battery level relative to voice calls, whilst continuing to watch television. The user can therefore continue to watch TV until they are happy they still have enough power left for their requirements.

In a still further alternative, the processor performs calculations for all usage types, and the user can toggle through the different uses as required, and perhaps have one or more usage-type calculation that is displayed as a default.

The Processor 14 will use the determined usage types to extract the required profile information from the appropriate segments in the Profile Information Means 11. This information will then be provided to the Calculation Means 16, which will use this information together with the battery level measurement, to provide the usage-type dependent battery level measurement. It is to be appreciated that these calculations can be made for applications that are currently in use, as well those which are not.

For instance, if the battery measurement unit has measured the remaining battery voltage to be 4.5 volts, and an indication of battery level is to be provided relative to the mobile television function, if the battery consumption information obtained from the Profile Information Means 11 indicates that the mobile television function consumes power at a rate of 9 volts per hour, then the calculation means 16 would arrive at an estimate of 30 minutes remaining for using the mobile television function. If the user is also to be provided with an indication of battery life relative to normal circuit switched calls, if the circuit switched call profile section indicates that calls consume power at a rate of 1.5 volts per hour, then the calculation means would arrive at an estimate of three hours "talk-time" remaining.

These time estimates would then be provided to the user, such as by visually displaying the values on the terminal's screen. Preferably the values are displayed alongside an image representing the usage-type, such as an image of a television for the mobile television application. It is to be appreciated that the values may be displayed in any suitable way, including in a scrollable list or an editable "favourable applications" list.

Therefore, in this way, this embodiment of the invention allows an educated prediction of battery consumption to be given for any particular usage type. This allows the user to be provided with an accurate indication of the battery life remaining for the current usage type and also the battery life that is remaining for any other possible use of the mobile terminal. More particularly, by displaying a time representation, the user is also provided with a meaningful indication of the remaining battery life.

In other words, according to this embodiment of the invention, consider the scenario of a terminal being programmed to display a battery level indication relative to a mobile television application as well as a remaining "talk-time" indication. If a user is watching broadcast mobile TV on their terminal the battery analyser and cell power information would inform the user that they currently have, for instance, approximately 1 hr 15 minutes of TV viewing left before my battery runs out. However as the terminal can make use of historic statistical receiver 'on time' and transmit power information the calculation means can use an appropriate algorithm to calculate how much talk time the user also has left in their current situation if they were to stop TV viewing now. For instance, the terminal may indicate that the user has approximately 2 hrs 15 minutes of talk time, which is a meaningful indication for the user, so they are likely to be happy to keep watching TV safe in the knowledge they can still make a long call if needed.

According to another embodiment of the invention, the profile information means 11 can store different usage-type profiles that are dependent on different external characteristics, such as ambient radio characteristics and/or the ageing characteristics of the battery.

Considering battery age, a typical battery can lose a high proportion of its effectiveness in one year. The actual proportion lost depends on the battery's chemistry. Therefore, by providing separate profiles for different battery ages, an even more accurate battery level indication can be provided. The battery condition could be estimated by determining the age of the battery, or taking measurements to monitor the actual battery condition.

In this regard, another factor that can be profiled is the battery chemistry. Monitoring the battery chemistry, such as the rate of decline in capacity of the battery, and combining these measurements with initial historial data on the battery chemistry and properties can provide even more accurate time measurements provided to the user.

Alternatively, or in addition the usage-type profiles may be location dependent in order to take into account different location specific characteristics, such as radio conditions. In this regard, there are various location specific considerations, for instance, rural environments typically have less rapid power transmission fluctuations, whilst urban environments typically have faster fluctuations, relative to wavelength, due to multi-path environmental factors. To determine the environmental conditions, information from the receiver, is typically used.

To create these location dependent profiles, the mobile terminal may record the radio conditions over a period of time and match these to a radio condition profile, such as the mobile terminal being indoors or outdoors. In this regard, modified profiles for each usage type could then be provided to take into account the radio conditions. For example, there may be a separate profile segment for normal circuit switched voice for when the mobile terminal is determined to be indoors, and outdoors.

Therefore, overall, in addition to historic statistical receiver 'on time' and transmit power information, in this embodiment of the invention, the terminal is able to determine the current radio conditions of the user's location, and use basic path loss calculations (often calculated for channel estimates) to arrive at time calculation for each application, as required It is to be appreciated that the location-dependent usage profiles may be provided separately to the functionality-dependent profiles, or in combination. In combination, for instance, it would be possible to provide separate mobile television functional profiles for indoor usage and outdoor usage.

In all these embodiments of the invention, in order to allow a location-dependent/functionality-dependent drain rate to be calculated, which takes into account time variant fluctuations, such as due to different transmitting and receiving power requirements, a matrix look-up table may be used.

These embodiments of the invention may be provided to a mobile terminal as a downloadable program, or be provided as an application or program on a mobile terminal as a standard feature.

The invention claimed is:

1. A method of providing a usage-dependent indication of battery level on a mobile telecommunications device, the method comprising:
    determining a battery level measurement;
    determining at least one usage-type, relative to which the battery level is to be indicated;
    determining a usage-type profile for the at least one usage-type;
    determining a radio condition profile associated with an environment of the mobile telecommunications device, wherein determining the radio condition profile includes recording radio conditions over a period of time and matching the radio conditions to the radio condition profile associated with the environment; and
    applying the usage-type profile and the radio condition profile to the determined battery level measurement to obtain a battery level indication relative to the at least one usage-type, wherein the battery level indication corresponds to use of the mobile communications device according to the at least one usage-type and is based on both the usage-type profile and the radio condition profile associated with the environment of the mobile telecommunications device.

2. The method of claim 1, wherein the usage-type profile includes historical and/or statistical profile information relevant to its specific usage-type.

3. The method of claim 1, wherein the usage-type profile includes power consumption information relevant to its specific usage type.

4. The method of claim 1 wherein the at least battery level indication is provided as a visual representation on a screen of the mobile telecommunications device.

5. The method of claim 1, wherein the at least one battery level indication includes a visual indication identifying the at least one usage-type and a time estimate for use of the mobile telecommunications device according to the at least one usage-type.

6. The method of claim 1, wherein the radio condition profile relates to a location of the mobile terminal.

7. The method of claim 1, wherein the radio condition profile includes an indoor condition and an outdoor condition.

8. The method of claim 1, further comprising:
    determining an age of the battery, and wherein the usage-type profile for the at least one usage-type is determined dependent on the battery age.

9. The method of claim 1 wherein the at least one usage type includes at least one of the following: voice calls; mobile television viewing; game playing; and interne usage.

10. The method of claim 1 wherein the determined battery level measurement is a battery voltage level measurement.

11. The method of claim 1 wherein the at least one usage type is functionality-dependent and/or location-dependent.

12. The method of claim 1, wherein the at least one usage-type includes a first usage-type and a second usage-type, and wherein a first usage-type profile is determined for the first usage-type and a second usage-type profile is determined for the second usage-type, and wherein the battery level indication is provided for the first usage-type according to the first usage-type profile and the radio condition profile and for the second usage-type according to the second usage-type profile and the radio condition profile.

13. A mobile telecommunications device, comprising:
    a battery device that determines a battery level measurement;
    a usage type determining device that determines at least one usage type relative to which the battery level is to be indicated;
    at least one profile device that:
    determines a usage-type profile for the at least one usage type; and
    determines a radio condition profile associated with an environment of the mobile telecommunications device, wherein the at least one profile device includes a recording device that records radio conditions over a period of time and matches the radio conditions to the radio condition profile associated with the environment; and
    a calculation device that applies the usage-type profile and the radio condition profile to the determined battery level measurement to obtain a battery level indication relative to the at least one usage-type, wherein the battery level indication corresponds to use of the mobile communications device according to the at least one usage-type and is based on both the usage-type profile and the radio condition profile associated with the environment of the mobile telecommunications device.

14. The mobile telecommunications device of claim 13, wherein the at least one profile device is configured to store historical and/or statistical profile information relating to the at least one usage type.

15. The mobile telecommunications device of claim 13, wherein the at least one profile device is configured to store power consumption information relating to the at least one usage type.

16. The mobile telecommunications device according to claim 13, further comprising:
    a display that displays a visual representation of the battery level indication.

17. The mobile telecommunications device according to claim 16, wherein the display is configured to display a visual indication identifying the at least one usage type and a time estimate for use of the mobile telecommunications device according to the at least one usage-type.

18. The mobile telecommunications device according to claim 13, further comprising:
a processor that determines a current battery age and provides the calculation device with at least one usage-type profile from the at least one profile device which is dependent on the current battery age.

19. The mobile telecommunications device according to claim 13, wherein the at least one usage-type enables at least one of the following functions: voice calls; mobile television viewing; game playing; and internet usage.

20. The mobile telecommunications device to claim 13, wherein the at least one usage type is functionality-dependent and/or location-dependent.

21. The mobile telecommunications device of claim 13, wherein the at least one usage-type includes a first usage-type and a second usage-type, and wherein a first usage-type profile is determined for the first usage-type and a second usage-type profile is determined for the second usage-type, and wherein the battery level indication is provided for the first usage-type according to the first usage-type profile and the radio condition profile and for the second usage-type according to the second usage-type profile and the radio condition profile.

22. A non-transitory computer readable medium storing computer software for providing a usage-dependent indication of battery level on a mobile telecommunications device, the computer software comprises executable instructions for:
determining a battery level measurement;
determining at least one usage-type, relative to which the battery level is to be indicated;
determining a usage-type profile for the at least one usage-type;
determining a radio condition profile associated with an environment of the mobile telecommunications device, wherein determining the radio condition profile includes recording radio conditions over a period of time and matching the radio conditions to the radio condition profile associated with the environment; and
applying the usage-type profile and the radio condition profile to the determined battery level measurement to obtain a battery level indication relative to the at least one usage-type, wherein the battery level indication corresponds to use of the mobile communications device according to the at least one usage-type and is based on both the usage-type profile and the radio condition profile associated with the environment of the mobile telecommunications device.

23. The non-transitory computer readable medium of claim 22, wherein the at least one usage-type profile includes at least one of: historical profile information relevant to a specific usage-type, statistical profile information relevant to the specific usage-type, or power consumption information relevant to the specific usage type.

24. The non-transitory computer readable medium of claim 22, wherein the battery level indication includes at least one of: a visual representation on a screen of the mobile telecommunications device or a visual indication identifying the at least one usage-type and a time estimate use of the mobile communications terminal according to the at least one usage-type.

25. The non-transitory computer readable medium of claim 22, wherein the radio condition profile relates to at least one of: a location of the mobile terminal, an indoor condition or an outdoor condition.

26. The non-transitory computer readable medium of claim 22, wherein the computer software further comprises executable instructions for:
determining an age of the battery, wherein the usage-type profile for the at least one usage-type is determined dependent on the battery age.

27. The non-transitory computer readable medium of claim 22, wherein the at least one usage type includes at least one of the following: voice calls; mobile television viewing; game playing; and internet usage.

28. The non-transitory computer readable medium of claim 22, wherein the at least one usage-type includes a first usage-type and a second usage-type, and wherein a first usage-type profile is determined for the first usage-type and a second usage-type profile is determined for the second usage-type, and wherein the battery level indication is provided for the first usage-type according to the first usage-type profile and the radio condition profile and for the second usage-type according to the second usage-type profile and the radio condition profile.

* * * * *